US010597487B2

(12) United States Patent
Eberle

(10) Patent No.: US 10,597,487 B2
(45) Date of Patent: Mar. 24, 2020

(54) STRAPS PRODUCED FROM RENEWABLE RAW MATERIALS

(75) Inventor: Ulrich Eberle, Filderstadt (DE)

(73) Assignee: Mosca GmbH, Waldbrunn (DE)

( * ) Notice: Subject to any disclaimer, the term of this patent is extended or adjusted under 35 U.S.C. 154(b) by 972 days.

(21) Appl. No.: 13/980,353

(22) PCT Filed: Feb. 3, 2012

(86) PCT No.: PCT/EP2012/051844
§ 371 (c)(1),
(2), (4) Date: Jul. 18, 2013

(87) PCT Pub. No.: WO2012/104409
PCT Pub. Date: Aug. 9, 2012

(65) Prior Publication Data
US 2013/0291741 A1 Nov. 7, 2013

(30) Foreign Application Priority Data
Feb. 4, 2011 (EP) ..................................... 11153390

(51) Int. Cl.
B65B 13/02 (2006.01)
C08G 63/02 (2006.01)
B29C 65/00 (2006.01)
B29C 63/10 (2006.01)
B29D 29/00 (2006.01)
B29C 65/02 (2006.01)
B29C 55/06 (2006.01)
B29C 65/08 (2006.01)
B29C 65/18 (2006.01)
B29C 65/06 (2006.01)
B29C 65/16 (2006.01)
B29C 65/20 (2006.01)

(52) U.S. Cl.
CPC .............. C08G 63/02 (2013.01); B29C 63/10 (2013.01); B29C 65/02 (2013.01); B29C 66/1122 (2013.01); B29C 66/4322 (2013.01); B29C 66/4324 (2013.01); B29C 66/71 (2013.01); B29C 66/73712 (2013.01); B29D 29/00 (2013.01); B65B 13/02 (2013.01); B29C 55/06 (2013.01); B29C 65/06 (2013.01); B29C 65/08 (2013.01); B29C 65/16 (2013.01); B29C 65/18 (2013.01); B29C 65/20 (2013.01); B29C 66/73161 (2013.01); B29C 66/73711 (2013.01); B29C 66/73791 (2013.01); B29K 2995/006 (2013.01); Y02W 90/11 (2015.05); Y02W 90/12 (2015.05)

(58) Field of Classification Search
CPC ........ B65B 13/02; B65B 13/32; B65D 63/10; B65D 65/46; B29D 29/00; B29C 66/1121; B29C 66/4322; B29C 66/4324; B29C 65/02; B29C 55/06; B29C 65/06; B29C 65/08; B29C 65/16; B29C 65/18; B29C 65/20; B29C 66/71; B29C 66/73711; B29C 66/73712; B29K 2001/00; B29K 2067/00; B29K 2077/00; B29K 2029/04; B29K 2067/046; B29K 2029/00; C08G 63/02; C08G 63/08
See application file for complete search history.

(56) References Cited

U.S. PATENT DOCUMENTS

| 1,189,029 | A |   | 6/1916 | Worrell |
|---|---|---|---|---|
| 3,316,687 | A |   | 5/1967 | Bartlett |
| 3,368,323 | A |   | 2/1968 | Wood |
| 3,442,732 | A |   | 5/1969 | Stensaker et al. |
| 3,661,667 | A |   | 5/1972 | Gardner et al. |
| 3,914,153 | A |   | 10/1975 | Sato |
| 3,943,608 | A |   | 3/1976 | Farkas |
| 3,946,921 | A | * | 3/1976 | Noguchi ............... B65B 13/184 100/26 |
| 4,852,299 | A |   | 8/1989 | Smoak et al. |
| 5,085,719 | A |   | 2/1992 | Eck |
| 5,403,897 | A |   | 4/1995 | Ebato et al. |
| 5,513,482 | A |   | 5/1996 | Nagashima et al. |
| 5,542,239 | A |   | 8/1996 | Fujii et al. |
| 6,210,769 | B1 |   | 4/2001 | DiPede et al. |
| 6,218,321 | B1 |   | 4/2001 | Lorcks et al. |
| 6,984,694 | B2 |   | 1/2006 | Blasius et al. |
| 7,121,447 | B2 |   | 10/2006 | Mosca et al. |
| 2002/0005246 | A1 |   | 1/2002 | Van Vliet et al. |
| 2002/0128358 | A1 |   | 9/2002 | Murschall et al. |
| 2002/0198332 | A1 | * | 12/2002 | Kasemura ............... C08L 67/02 525/450 |

(Continued)

FOREIGN PATENT DOCUMENTS

| BE | 1013972 A7 | 1/2003 |
|---|---|---|
| DE | 44 25 703 A1 | 1/1995 |

(Continued)

OTHER PUBLICATIONS

Translation of an abstract of JP 09031171A, Fujii et al., "Production of Polylactic Acid", Published dated Feb. 4, 1997.*
"Epoxy resin", Jan. 2017, Machine Translation enclosed.
Rafael Auras, et al., "Poly(Lactic Acid): Synthesis, Structures, Properties, Processing, and Applications", Hoboken, New Jersey 2010, 7 pps.
Victor H. Orozco, et al., "Preparation and Characterization of Poly(Lactic Acid)-g-Maleic Anhydride + Starch Blends", Macromol. Symp. 2009, 277, pp. 69-80.
Maurizio Avella, et al., "Poly(Lactic Acid)-Based Biocomposites Reinforced with Kenaf Fibers", ResearchGate, Journal of Applied Polymer Science, Jun. 2008, DOI: 10.1002/app.28004, 11 pps.
Volker Frenz, et al., "Multifunctional Polymers as Chain Extenders and Compatibilizers for Polycondensates and Biopolymers", ANTEC 2008, 5 pps.

(Continued)

Primary Examiner — Jimmy T Nguyen
(74) Attorney, Agent, or Firm — Muirhead and Saturnelli, LLC

(57) ABSTRACT

An extruded strap is produced of a material containing renewable raw materials and the ends of which strap can be welded together. A method for producing the extruded strap and a method for strapping an article using the extruded strap are also provided.

12 Claims, No Drawings

(56) References Cited

U.S. PATENT DOCUMENTS

| | | | |
|---|---|---|---|
| 2003/0041964 A1 | 3/2003 | Schwertfeger | |
| 2004/0232202 A1 | 11/2004 | Mosca et al. | |
| 2008/0182472 A1 | 7/2008 | Ogasawara et al. | |
| 2008/0214699 A1 | 9/2008 | Halahmi et al. | |
| 2008/0277297 A1* | 11/2008 | Busch | B32B 27/36 |
| | | | 206/242 |
| 2009/0186992 A1* | 7/2009 | Higuchi | C08K 5/0083 |
| | | | 525/450 |
| 2009/0246430 A1 | 10/2009 | Kriegel et al. | |
| 2009/0275678 A1 | 11/2009 | Kumazawa et al. | |
| 2010/0056656 A1 | 3/2010 | Matsuoka et al. | |
| 2010/0071170 A1* | 3/2010 | Burout | G09F 3/08 |
| | | | 24/16 R |
| 2010/0305520 A1 | 12/2010 | Hayes | |
| 2012/0058346 A1* | 3/2012 | Jeon | B29C 48/832 |
| | | | 428/412 |

FOREIGN PATENT DOCUMENTS

| | | |
|---|---|---|
| DE | 9419475.0 | 3/1995 |
| DE | 29520448 U1 | 4/1996 |
| DE | 29520449 U1 | 4/1996 |
| DE | 4446054 A1 | 6/1996 |
| DE | 19654030 A1 | 6/1998 |
| DE | 69920702 T2 | 11/2005 |
| DE | 202006007115 U1 | 7/2006 |
| DE | 102007032860 A1 | 2/2008 |
| EP | 0 672 593 A2 | 2/1995 |
| EP | 0799335 A1 | 10/1997 |
| EP | 1 354 908 A1 | 10/2003 |
| EP | 1094776 B1 | 9/2004 |
| EP | 1 479 611 A2 | 11/2004 |
| EP | 1 859 916 A1 | 11/2007 |
| EP | 2 096 141 A1 | 9/2009 |
| FR | 1013972 | 5/1952 |
| GB | 1189029 | 4/1970 |
| JP | H07-300154 A | 11/1995 |
| JP | 09031171 A * | 2/1997 |
| JP | 2010-24492 | 1/1998 |
| JP | H1024492 A | 1/1998 |
| JP | 2011-165338 | 6/1999 |
| JP | H11165338 A | 6/1999 |
| JP | 2011-277640 | 10/1999 |
| JP | H11277640 A | 10/1999 |
| JP | 2001-019027 A | 1/2001 |
| JP | 2001019027 A | 1/2001 |
| JP | 2002-294047 A | 10/2002 |
| JP | 2002291515 A | 10/2002 |
| JP | 2002-348445 A | 12/2002 |
| JP | 2002348445 A | 12/2002 |
| JP | 2003072828 A | 3/2003 |
| JP | 3421620 B1 | 4/2003 |
| JP | 2004-034994 A | 2/2004 |
| JP | 2004034994 A | 2/2004 |
| JP | 2004202064 A | 7/2004 |
| JP | 2004248940 A | 9/2004 |
| JP | 2005-179550 A | 7/2005 |
| JP | 2006-036899 A | 2/2006 |
| JP | 2007-314656 A | 12/2007 |
| JP | 2008-041702 A | 2/2008 |
| JP | 2008-247422 A | 10/2008 |
| JP | 2009-73498 A | 4/2009 |
| WO | WO 93/00210 | 1/1993 |
| WO | WO 2008/078413 A1 | 7/2008 |

OTHER PUBLICATIONS

Press release of Mosca dd. Sep. 1, 2010 in German language.
Press release of Mosca dd. Sep. 1, 2010 in English language.
"Plastic strap for bundling", www.contimeta.com/en/pageid/plastic-strap, retrieved on May 10, 2017, 1 pp.
Strapex, "High performance machines for plastic strapping", Product specification SMG 10/15/25 of Jul. 2008.
Strapex, Product manual SMG Jul. 10, 2009.
Erol Sancaktar, et al., "Effects of Fillers on Ultrasonic Welding of Polypropylene", ASME 2003, 17 pps.
Excerpt from the database of the Institute for Bioplastics and Biocomposites, University of Hannover: http://ifbb-knvb.wp.hshannover.de/db/details/show/:1/28, retrieved on Apr. 11, 2017 (O5).
Michael J. Troughton, "Handbook of Plastics Joining", A Practical Guide, 2nd edition of 2008, 3pps., (O6).
Thoru Nakatsuka, "Polylactic Acid-Coated Cable", Fujikara Technical Review, 2011, 8 pps.
Sven Jacobsen, "Polylactides", *WechselWirkungen*—Jahrbuch 2000, 35 pps.
Dipl.-Ing. Rolf Schicketanz, et al., "Hot wedge welding of plastic waterproofing membranes with ceramic heating elements—an inventory," Berlin 2011, pp. 1 and 22.
M. J. Troughton, PDL Handbook Series, "Handbook of Plastics Joining: A Practical Guide" Section Edition, 2008, pp. 3-13.
Technical Data Sheets (Bilingual) of Mosca's Strapping Machines RO-MS-4/1 (2010) and RO-MP-5 (2006).
Devesh Tripathi, "Practical Guide to Polypropylene," Shawbury (UK) 2002, pp. 89-92.
P.E. Mitchell, "Tool and Manufacturing Engineers Handbook," Dearborn (Michigan) 1998, 4th edition, vol. IX, p. 13-29.
Excerpt from online glossary by the firm Kemapack, www.kemapack.com/mein-kemapack/wissen-und-normen/wichtige-fachbegriffe, (retrieved on Jan. 25, 2018).
Manual of Signode's LBX-2000 welding machine, Glenview (Illinois) 2010.
Leaflet of Signode's LBX-2000 welding machine, Buffalo Grove (Illinois) 2004 (rev. 2014).
Affidavit by Timothy Pearson of the firm Signode, Jan. 2018.
Manual of Signode's strapping head AK 200, "Plastic Strapping Head," (1999).

\* cited by examiner

STRAPS PRODUCED FROM RENEWABLE RAW MATERIALS

TECHNICAL FIELD

This application relates to an extruded strapping tape which may be welded with itself and is made of a material which contains renewable raw material, as well as to a method for the manufacture thereof and a method for strapping an object.

BACKGROUND OF THE INVENTION

Tapes for packing purposes, which were made of completely biodegradable materials, were developed in the mid-1990s. These tapes mainly contained starch. In principle, these tapes could be welded together. However, due to the poor thermal resistance of starch, these tapes were entirely unsuitable as strapping tapes, since the weld broke under the tensile load usual for strapping tapes. Due to the fact that starch belongs to the polysaccharides, these tapes at the time were not hydrolytically stable and had a low dimensional stability under heat. In addition, a very high concentration of other components, such as polyhydroxybutyrate, is mixed with industrial starch, which creates additional disadvantages. The tapes developed at the time were unsuitable as strapping tapes (see DE 295 20 448 U1, DE 295 20 449 U1 or EP 0 799 335 B1).

DE 196 54 030 C2 describes a textile cultivation carrier, in which a cable-like, three-dimensional mesh structure made of polyethylene is provided. In column 2, line 35, this polyethylene is described as a typical material of strapping tapes for automatic packing machines. In addition to this material for the mesh structure, the claimed cultivation carrier also has a textile structure which is to be used as a cultivation surface for microorganisms. This textile structure may be made of degradable, organic substances (Column 1, Line 18). Despite the clearly presented technical object, it did not occur to those skilled in the art at the time to also use a degradable, organic material as the material for the cable-like mesh structure. This shows that there was obviously a preconception against using organic, degradable materials for strapping tapes.

DE 44 46 054 A1 describes high strength filaments made of renewable raw materials based on starch. Strapping tapes, among other things, are mentioned as a possible application on Page 4, Line 46. In addition to their complex manufacturing process, however, woven strapping tapes have many disadvantages, so that they were unable to prevail.

Accordingly, it would be desirable to provide a strapping tape which may be welded together in such a way that afterwards it not only provides the necessary tensile strength for use as a strapping tape as well the necessary dimensional stability under heat and hydrolytic stability but is also generally biodegradable.

SUMMARY OF THE INVENTION

According to a first specific embodiment of the system described herein, an extruded strapping tape is provided which may be welded together and is made of a material which contains renewable material and is biodegradable, as the case may be.

In this way, biodegradable strapping tapes could be made available for the first time, which provide the necessary hydrolytic stability and dimensional stability under heat as well as the tensile strength required for use as a strapping tape.

In various embodiments, the renewable raw material is preferably selected from the group of cellulose, aliphatic polyesters, polyamide, aliphatic polyester amide, polyhydroxyalkanoate, polyvinyl alcohol, polyalkylenglycol, lignin or a copolymer which contains at least one of the compounds, or it is selected from mixtures or derivatives thereof. In contrast to the starch-based package tapes previously known, biodegradable strapping tapes could be obtained for the first time, which had a particularly high hydrolytic stability and high dimensional stability under heat. As a polysaccharide, starch also had the further disadvantage that the package tapes made of starch, for example, thermally degraded during welding, causing the welds to become, so to speak, predetermined breaking points. These disadvantages could be overcome by this specific embodiment. The starch concentration in the strapping tape according to the system described herein is therefore also preferably a maximum of 10 wt. %, in particular a maximum of 5 wt. %. In an embodiment, the strapping tape according to the system described herein does not contain any starch. Another disadvantage of the starch-based packing tapes known from the prior art was also that industrial starch usually contains over 50 wt. % polyhydroxybutyrate, for example.

The renewable raw material is preferably an aliphatic polyester, particularly preferably poly lactic acid (PLA), polybutylene succinate (PBS) or mixtures or derivatives thereof. These special aliphatic polyesters proved to be particularly suitable, since the strapping tapes obtained in this way had a particularly good hydrolytic stability and a high dimensional stability under heat.

The poly lactic acid is preferably made of at least 40 wt. % L-lactic acid, in particular at least 70 wt. % L-lactic acid, exceptionally preferably at least 90 wt. % L-lactic acid. Surprisingly, it has indeed been shown that such a particularly high degree of crystallization may be achieved, so that these tapes may be particularly effectively stretched. Tapes having a higher concentration of D acid appeared to yield an amorphous polymer, which was less suitable for stretching.

The renewable raw material is advantageously modified with a coupling reagent which is selected from the group of maleic acid derivatives, glycidylmethacrylate derivatives, methacrylic acid derivatives, organosilicon compounds, vinyl acetate derivatives or mixtures thereof. The organosilicon compounds may be, in particular, silane derivatives such as VTMS (vinyltrimethoxysilane). This makes it possible to obtain an entirely new raw material which is surprisingly suitable for use as a strapping tape. In particular, the starch, which is otherwise disadvantageous, may be modified thereby in such a way that it may even be suitable for use as a strapping tape.

The material of the strapping tape preferably contains at least 10 wt. % renewable raw materials, particularly preferably at least 70 wt. % renewable raw materials. This makes it possible to ensure that the strapping tape is particularly effectively biodegradable.

In various embodiments, the strapping tape is preferably stretched, in particular uniaxially stretched, and may be stretched at least 1:3. As a result, the properties which are particularly important for a strapping tape, such as tensile strength, tear strength and stretching behavior, may be particularly favorably influenced. The width of the strapping tape according to the system described herein is in a range of, for example, 3 mm to 50 mm, in particular in a range of 4 mm to 32 mm. The thickness of the strapping tape according to the system described herein is in a range of, for example, 0.2 mm to 2 mm, in particular in a range of 0.4 mm to 1.5 mm. For example, the surface of the tape may be either smooth or roughened with the aid of an embossing profile. The strapping tape is wound onto a roll having a tape length of usually 1,000 m to 8,000 m. These dimensions make the strapping tape particularly suitable for its intended use, namely for automatic strapping of objects with the aid of semiautomatic or fully automatic strapping devices.

The melt volume flow rate (MVR) according to DIN EN ISO 1133 is 190° C. and 2.16 kg, for example in a range of 3 to 8. The glass transition temperature of the renewable raw material is in a range of, for example, 50° C. to 80° C. The density of the renewable raw material is in a range of, for example, 1.1 g/cm$^3$ to 1.4 g/cm$^3$. The melting point of the renewable raw material is in a range of, for example, 130° C. to 200° C. These properties of the renewable raw material have proven to be particularly suitable for obtaining an easy-to-manufacture strapping tape which has good mechanical properties.

The weight average of the molar mass $M_W$ of the renewable raw material is preferably in a range of 20,000 g/mol to 300,000 g/mol, in particular in a range of 100,000 g/mol to 220,000 g/mol. Such renewable raw materials surprisingly result in strapping tapes which have a particularly balanced ratio between low brittleness and high tensile strength.

Common addition agents, additives and other modifiers may be contained at, for example, 0 wt. % to 10 wt. %, in particular 0.5 wt. % to 2 wt. %.

In addition to the renewable raw material at 10 wt. % to 90 wt. %, the material of the strapping tape may contain additional thermoplastic and possibly biodegradable materials.

The renewable raw material may also be a copolymer, in particular a copolymer of poly lactic acid. The monomer concentration of L-lactic acid in the precursor to poly lactic acid is preferably more than 10%, in particular more than 50%, exceptionally preferably more than 90%.

The fiber content of the strapping tape according to the system described herein may be a maximum of 10 wt. %, in particular a maximum of 1 wt. %. In an embodiment, the strapping tape according to the system described herein may not contain any fibers. This makes it possible to avoid inhomogeneities in the properties, in particular when processing fibers together with thermoplastic materials, for example due to air pockets.

The strapping tape according to the system described herein may be welded, for example using ultrasonic welding, laser welding, friction welding and/or contact welding.

The strapping tape according to the system described herein may be, for example, embossed or smooth.

According to another specific embodiment of the system described herein, a method for manufacturing a strapping tape according to the system described herein may include:
a) Melting and extruding a material which contains a renewable raw material; and
b) Cooling the molten material in a fluid; and
c) Stretching, fixing and/or cooling the obtained tape.

The extrusion temperature is in a range of, for example, 170° C. to 250° C., particularly preferably in a range of 190° C. to 220° C. Granulate may be used as the raw material. A single-screw or twin-screw extruder may be used. A slot die may be used for shaping during extrusion.

The extrudate is preferably placed in a water bath immediately after extrusion. This water bath has a temperature in the range of, for example, 5° C. to 75° C. For example, the strapping tape may then be uniaxially stretched in different fluids. The stretching may particularly preferably take place in air or water. For example, the strapping tape is stretched in a ratio of 1:3 to 1:8. If necessary, the resulting strapping tape may be subsequently embossed.

The strapping tape may then be fixed in air and cooled in air or in an aqueous medium and subsequently coiled onto a spool, if necessary.

According to another specific embodiment, a method for strapping an object with a strapping tape according to the system described herein may include placing the strapping tape around the object in such a way that the strapping tape overlaps itself in at least one location, and the overlapping points on the strapping tape are subsequently welded together at this location.

The welding may take place using friction welding, laser welding or heated wedge welding. The overlapping points are particularly preferably welded together using ultrasonic welding.

Previously, it has been practically impossible to weld, in particular, stretched renewable raw materials and, in particular, aliphatic polyesters, such as poly lactic acid. There was the preconception that renewable raw materials, in particular, would be thermally degraded thereby, and the mechanical properties would deteriorate so much that a use as a strapping tape would no longer be possible. Surprisingly, it has now been discovered that renewable raw materials may be welded using ultrasonic welding without losing their basic suitability as a strapping tape having, for example, the substantial tensile strength necessary for this purpose.

DETAILED DESCRIPTION OF VARIOUS EMBODIMENTS

Granulate of poly lactic acid (PLA Polymer 4032D from NatureWorks), which is an L-poly lactic acid, was melted on and extruded through a slot die at 220° C., using a single-screw extruder. The extrudate was placed in a water bath at a temperature of 50° C. and subsequently stretched 1:4 in air. The resulting tape was then fixed in air and cooled and subsequently coiled onto a spool. This resulting strapping tape was then used to strap a common moving box in a test by placing the tape around the moving box so that both ends of the strapping tape overlapped by 2 cm. The overlapping ends of the strapping tape were welded together using ultrasonic welding. Overall, the manufacturing parameters and, in particular, the thickness and width of the slot die for extrusion, were selected in such a way that a strapping tape having a thickness of 0.7 mm and a width of 12 mm resulted after stretching.

The strapping tape manufactured according to the system described herein was embossed on its surface and had a tear strength of more than 145 N/mm$^2$ (according to DIN 53504). The elongation at break was less than 20% (according to DIN 53504). No degradation due to hydrolysis could be observed. The obtained strapping tape was hydrolytically stable. The obtained strapping tape was furthermore dimensionally stable under heat at a temperature of at least 70° C.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An extruded strapping tape which is uniaxially stretched and which is weldable with itself and which is made of a renewable raw material that is a poly lactic acid (PLA),
   wherein the strapping tape has a width in a range of 4 millimeters to 32 millimeters,
   wherein the strapping tape has a thickness in a range of 0.2 millimeters to 2 millimeters, and
   wherein the poly lactic acid is made of at least of 90 wt. % L-lactic acid.

2. The strapping tape as recited in claim 1, wherein the renewable raw material is modified with a coupling reagent which is selected from the group of: maleic acid derivatives, glycidylmethacrylate derivatives, methacrylic acid derivatives, organosilicon compounds, vinyl acetate derivatives or mixtures thereof.

3. The strapping tape as recited in claim 1, wherein a weight average of a molar mass of the renewable raw material is in a range of 20,000 g/mol to 300,000 g/mol.

4. The strapping tape as recited in claim 1, wherein a fiber content is a maximum of 10 wt. %.

5. The strapping tape as recited in claim 1, wherein the strapping tape is stretched at least 1:3.

6. The strapping tape as recited in claim 3, wherein the weight average of the molar mass of the renewable raw material is in a range of 100,000 g/mol to 220,000 g/mol.

7. The strapping tape as recited in claim 4, wherein the fiber content is a maximum of 1 wt. %.

8. The strapping tape as recited in claim 1, wherein the material of the strapping tape includes at least 70 wt. % renewable materials.

9. The strapping tape as recited in claim 1, wherein the strapping tape is free of any fibers.

10. The strapping tape as recited in claim 1, wherein a surface of the strapping tape is embossed.

11. The strapping tape as recited in claim 1, wherein the strapping tape is wound onto a roll having a tape length in a range of 1000 meters to 8000 meters.

12. An extruded strapping tape that is uniaxially stretched, weldable with itself and made of a renewable raw material that is a poly lactic acid (PLA),
   wherein the poly lactic acid is made of at least of 90 wt. % L-lactic acid,
   wherein the strapping tape is free of any fibers,
   wherein the strapping tape has a width in a range of 4 millimeters to 32 millimeters,
   wherein the strapping tape has a thickness in a range of 0.2 millimeters to 2 millimeters,
   wherein a surface of the strapping tape is embossed, and
   wherein the strapping tape is wound onto a roll having a tape length in a range of 1000 meters to 8000 meters.

* * * * *